3,133,052
QUATERNATED DISAZO DYESTUFFS
Ernest Merian, Bottmingen, and Bruno J. R. Nicolaus, Basel, Switzerland, assignors to Sandoz Ltd., Basel, Switzerland, a Swiss firm
No Drawing. Filed Dec. 8, 1959, Ser. No. 858,068
Claims priority, application Switzerland Jan. 8, 1959
6 Claims. (Cl. 260—158)

This invention relates to new quaternated azo dyestuffs of the general formula $$X^- \ (R_1^+ —N=N—R_2—N=N—R_3—OH)$$

wherein
$R_1^+$ stands for the radical of a monocyclic or polycyclic hereocyclic diazo component which may be substituted by non-ionic substituents and which contains at least one quaternated nitrogen atom in the ring,
$R_2$ for a phenylene or naphthylene radical which may be substituted by non-ionic substituents,
$R_3$—OH for the radical of an aromatic hydroxy compound coupled in the ortho- or para-position to the hydroxy group, or the radical of an enolizable ketomethylene compound, and
$X^-$ for an anion equivalent to the dyestuff cation.

The process for the production of the new quaternary azo dyestuffs consists in reacting 1 mole of a water-insoluble disazo compound of the formula

$$R_4—N=N—R_2—N=N—R_3—OH$$

wherein $R_4$ stands for the radical of a monocyclic or polycyclic hererocyclic diazo component which may be substituted by non-ionic substituents and which contains at least one quaternable nitrogen atom in the ring, and wherein $R_2$ and $R_3$ possess the aforestated meanings, with at least 1 mole of an alkylating or aralkylating agent.

Examples of suitable diazo components $R_4$—$NH_2$ are the amino derivatives of a thiazole, a benzothiazole, a higher condensed thiazole, a pyrazole, a cinnoline, an imidazole, a triazole, a tetrazole, an oxazole, an oxydiazole, a thiodiazole, a benzimidazole, a naphthimidazole, an indazole, a pyridine, 2-, 3- or 4-methylpyridine, 3.4-dimethylpyridine, quinoline, isoquinoline, acridine or benzoxazole which may by substituted by non-ionic groups.

The reaction of the water-insoluble azo dyestuffs with the alkylating or aralkylating agent is effected at high temperatures in an inert solvent or aqueous suspension according to circumstances, the medium being buffered if necessary.

Suitable alkylating or aralkylating agents are e.g. the esters of strong mineral acids and organic sulfonic acids, alkyl chlorides, iodides and bromides, aralkyl halides, dialkyl sulfates and benzenesulfonic acid esters which may be further substituted such as the methyl, ethyl, propyl, n-butyl esters of benzenesulfonic acid, 2- or 4-methylbenzenesulfonic acid, 4-chlorobenzenesulfonic acid or 4-nitrobenzenesulfonic acid. When the alkyl chlorides or bromides used are gaseous or have a low boiling point, e.g., methyl chloride, methyl bromide, ethyl chloride or ethyl bromide, quaternation is best carried out in pressurized equipment.

The end products are separated by one of the standard basic operations such as filtration, reduction to a small volume by evaporation of solvent, or precipitation from the solvent with a suitable agent.

Organic or inorganic anions may be employed, e.g.,  formate, acetate, propionate, butyrate, oxalate, lactate, tartrate, citrate, crotonate or acrylate ions, or chloride, bromide, iodide, methylsulfate, ethylsulfate, sulfate, carbonate, phosphate, bisulfate, benzenesulfonate, 4-methylbenzene-and 4-chlorobenzenesulfonate ions.

Also suitable are water-soluble double salt compounds of dyestuff bases with certain inorganic salts such as zinc chloride.

Higher fatty acids which may be substituted by non-ionic substituents can be used as anion-yielding compounds; examples are caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid or arachidic acid, and unsaturated higher fatty acids such as oleic acid, elaidic acid, eruric acid, geranic acid, linoleic acid, linolenic acid; also other aromatic or aliphatic carboxylic or sulfonic acids. These acids yield salts which are poorly soluble or insoluble in water but which readily dissolve in acetone and dimethylformamide and are therefore well suited for the coloration of lacquers, e.g., nitrocellulose lacquers, and the dyeing of acrylic fibers in the mass.

When the anions used are phosphotungstic acid, phosphotungstomolybdic acid, silicomolybdic acid, silicotungstic acid, various other inorganic complex acdis or double salts, dyestuffs containing sulfonic acid or/and carboxylic acid groups and free dyestuff acids of metal-complex dyestuffs, e.g., 2:1 metal complexes free from sulfonic and carboxylic acid groups, salts are obtained which are insoluble in water and some of them in organic solvents as well. Very attractive and brilliant scarlet lacquers are obtained with a red acid dyestuff of this type, while a blue acid dyestuff yields a similarly attractive green lacquer.

The new basic dyestuffs are suitable for dyeing and printing polyacrylonitrile fibers containing more than 80% of acrylonitrile, e.g., Orlon (registered trademark) and copolymers of 95% acrylonitrile and 5% vinyl acetate, methyl acrylate or methyl methacrylate. On these materials they possess excellent building-up and levelling properties and give deep shades of good fastness to light, washing, perspiration, sublimation, pleating, pressing, water, sea water and bleaching.

The dyestuffs according to the invention and their double salts are best applied from an aqueous, weakly acid suspension or solution, preferably in presence of dispersing agents of non-ionic, anionic or cationic character and at high temperature. The dyestuffs can be applied in closed dyeing machines at high temperature under pressure.

With the dyestuffs of the invention blended fabrics having polyacrylonitrile as one of the components can be successfully dyed, while cotton, wool and viscose rayon are reserved. A number of the dyestuffs are suitable for dyeing polyacrylonitrile in the mass in shades fast to light, washing and perspiration. Those derivatives which possess good solubility in organic solvents can be employed for the mass coloration of oils, lacquers, plastic molding compounds and cellulose acetate fibers. Some of the derivatives obtained by laking dyestuff bases with complex inorganic or organic acids or with acid dyestuffs and which are insoluble in organic solvents are applicable as pigments, e.g., for the mass coloration of polyacrylonitrile fibers in red, violet and blue shades of good all-around fastness.

The new basic dyestuffs have many other uses, e.g., the dyeing of tannin-treated cotton, wool, silk, regenerated cellulose, polyamide fibers and paper in all stages of manufacture. It has been found that mixtures of two or more basic dyestuffs can be employed with advantage.

In the examples which follow the parts and percentages are by weight and the temperatures in degrees centigrade.

EXAMPLE 1

22 parts of the disazo dyestuff of the formula

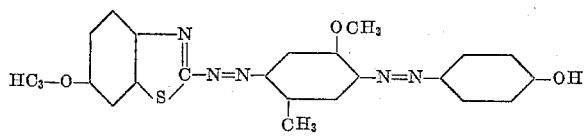

are finely ground and dissolved in 1000 parts of boiling chlorobenzene, 7 parts of dimethyl sulfate are added dropwise to the yellow solution at 100° with thorough stirring. The solution changes color to blue fairly quickly and the quaternated dyestuff is precipitated in the form of hard crystals and on completion of alkylation, which can be observed from the change of color, it is filtered off and dried. The dyestuff formed is sufficiently pure for practical purposes; it dissolves in sulfuric acid with a yellow and in water with a blue coloration and dyes polyacrylonitrile fibers from aqueous solution in reddish blue shades of excellent fastness to light, washing, perspiration, sublimation, pleating, water, sea water and pressing. Possessing outstandingly good building-up properties, it is especially valuable for the production of heavy shades while its good level dyeing properties are evident even in shades of light depth.

Similar quaternated disazo dyestuffs are obtained when in place of dimethyl sulfate one of the following alkylating or aralkylating agents is used: diethyl sulfate, benzene-, 2- or 4-methylbenzene-, 2- or 4-chlorobenzenesulfonic acid methyl, ethyl, propyl or butyl esters, methane-, ethane- or butanesulfonic acid methyl or ethyl esters, methyl, ethyl, propyl or butyl chloride, bromide or iodide, benzyl chloride or bromide. When gaseous alkyl halides or those of low boiling point are employed, such as methyl chloride, ethyl chloride, methyl bromide or ethyl bromide, alkylation is carried out preferably in a pressure vessel.

A typical dyeing method for the dyestuffs of the invention is as follows.

35 parts of the dyestuffs of Example 1 and 65 parts of dextrin are intimately ground. 1 part of the preparation obtained is suspended in 3000 parts of water at room temperature and 5 parts of acetic acid added to acidify the bath. 100 parts of a scoured fabric of polyacrylonitrile fiber are entered at 50°, the dyebath brought to the boil in 30 minutes and dyeing continued for 1 hour at the boil. The dyed fabric is then rinsed, soaped for 20 minutes in a boiling bath containing 1 gram per liter of a non-ionic detergent, rinsed and dried. The fabric is dyed in a deep level blue shade which has good fastness to light, washing, water, milling, perspiration, sea water, pleating and heat setting.

Further valuable basic dyestuffs which can be produced according to the details given in Example 1 are described in the following table; they have the formula

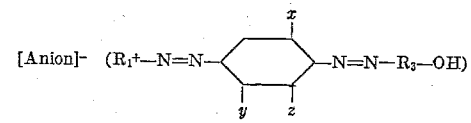

| No. | $R_1$ | $x$ | $y$ | $z$ | $R_3$—OH | Shade of dyeing on polyacrylonitrile fibers |
|---|---|---|---|---|---|---|
| 2. | N-methyl-6-methoxybenzothiazolyl-2- | H | $CH_3$ | H | 4'-hydroxyphenyl | Reddish blue. |
| 3. | do | H | $OCH_3$ | H. | do | Do. |
| 4. | do | H | $OC_2H_5$ | H | do | Do. |
| 5. | do | H | $C_2H_5$ | H | do | Do. |
| 6. | do | $OCH_3$ | $OCH_3$ | H | do | Do. |
| 7. | do | $CH_3$ | $CH_3$ | H | do | Do. |
| 8. | do | $C_2H_5$ | $C_2H_5$ | H | do | Do. |
| 9. | do | $OC_2H_5$ | $OC_2H_5$ | H | do | Do. |
| 10. | do | $OCH_3$ | $C_2H_5$ | H | do | Do. |
| 11. | do | $OC_2H_5$ | $CH_3$ | H | do | Do. |
| 12. | do | $OC_2H_5$ | $C_2H_5$ | H | do | Do. |
| 13. | do | H | CH=CH—CH=CH | | do | Blue. |
| 14. | do | | $OCH_3$ | $CH_3$ | H | 3'-methyl-4'-hydroxyphenyl | Reddish blue. |
| 15. | do | $OCH_3$ | $CH_3$ | H | 2'-methyl-4'-hydroxyphenyl | Do. |
| 16. | do | $OCH_3$ | $CH_3$ | H | 2'-hydroxy-5'-methylphenyl | Do. |
| 17. | do | $OCH_3$ | $CH_3$ | H | 2'-hydroxy-5'-chlorophenyl | Do. |
| 18. | do | $OCH_3$ | $CH_3$ | H | 3'-acetylamino-4'-hydroxyphenyl | Do. |
| 19. | do | $OCH_3$ | $CH_3$ | H | 2'-acetylamino-4'-hydroxyphenyl | Do. |
| 20. | do | $OCH_3$ | $CH_3$ | H | 2'-hydroxy-5'-acetylaminophenyl | Do. |
| 21. | do | $OCH_3$ | $CH_3$ | H | 4-hydroxy-naphthyl | Blue. |
| 22. | do | $OCH_3$ | $CH_3$ | H | 2-hydroxy-naphthyl | Do. |
| 23. | do | $OCH_3$ | $CH_3$ | H | Phenylpyrazolonyl | Reddish blue. |
| 24. | do | $OCH_3$ | $CH_3$ | H | (Phenylcarbamyl)-(acetyl)-methyl | Do. |
| 25. | do | $OCH_3$ | $CH_3$ | H | Methylpyrazolonyl | Do. |
| 26. | N-ethyl-6-methoxybenzothiazolyl-2- | $OCH_3$ | $CH_3$ | H | 4'-hydroxyphenyl | Do. |
| 27. | N-benzyl-6-methoxybenzothiazolyl-2- | $OCH_3$ | $CH_3$ | H | do | Do. |
| 28. | N-methylbenzothiazolyl-2- | $OCH_3$ | $CH_3$ | H | do | Do. |
| 29. | N-methyl-6-ethoxybenzothiazolyl-2- | $OCH_3$ | $CH_3$ | H | do | Do. |
| 29. | N-methyl-6-ethoxybenzothiazolyl-2- | $OCH_3$ | $CH_3$ | H | do | Do. |
| 30. | N-methyl-6-methylbenzothiazolyl-2- | $OCH_3$ | $CH_3$ | H | do | Do. |
| 31. | N-methylthiazolyl-2- | $OCH_3$ | $CH_3$ | H | do | Do. |
| 32. | N-ethylthiazolyl-2- | $OCH_3$ | $CH_3$ | H | do | Violet. |
| 33. | N-methylpyridyl-2- | $OCH_3$ | $CH_3$ | H | do | Do. |
| 34. | N-methylquinolyl-2- | $OCH_3$ | $CH_3$ | H | do | Red-violet. |
| 35. | N-methyl-5-methylthiazolyl-2- | $OCH_3$ | $CH_3$ | H | do | Do. |
| 36. | N-methyltriazolyl-2- | $OCH_3$ | $CH_3$ | H | do | Bluish violet. |
| 37. | N-methylbenzimidazolyl-2- | $OCH_3$ | $CH_3$ | H | do | Red-violet. |
| 38. | N-methyl-6-methylbenzoxazolyl-2- | $OCH_3$ | $CH_3$ | H | do | Do. |
| 39. | N-methyl-6-methoxybenzocazolyl-2 | $OCH_3$ | $CH_3$ | H | do | Blue-violet. |
| 40. | N-methyl-2-methylpyridyl-3- | $OCH_3$ | $CH_3$ | H | do | Do. |
| 41. | N-methyl-3-methylpyridyl-2- | $OCH_3$ | $CH_3$ | H | do | Red-violet. |
| 42. | N-methyl-isoquinolyl-1- | $OCH_3$ | $CH_3$ | H | do | Do. |
| 43. | N-methyl-6-methoxybenzthiazolyl-2- | $OCH_3$ | CH=CH—CH=CH | | do | Blue. |
| 44. | N-ethyl-6-methoxy-benzothiazolyl-2- | $OCH_3$ | $OCH_3$ | H | do | Reddish blue. |
| 45. | N-methyl-thiazolyl-2- | $OCH_3$ | $OCH_3$ | H | do | Do. |
| 46. | N-methyl-isoquinolyl-3- | $OCH_3$ | $CH_3$ | H | do | Red-violet. |

| No. | R₁ | x | y | z | R₃—OH | Shade of dyeing on polyacrylonitrile fibers |
|---|---|---|---|---|---|---|
| 47. | N-methyl-acridyl-5 | OCH₃ | CH₃ | H | 4'-hydroxyphenyl | Red-violet. |
| 48. | N-methyl-6-methoxy-benzothiazolyl-2 | OC₂H₅ | CH=CH—CH=CH | | do | Blue. |
| 49. | do | H | Cl | H | do | Reddish blue. |
| 50. | do | H | Br | H | do | Do. |
| 51. | do | H | CH₃CO—NH | H | do | Blue. |
| 52. | do | H | C₂H₅—CONH | H | do | Do. |
| 53. | N-methyl-6-ethyl-benzothiazolyl-2 | OCH₃ | OCH₃ | H | do | Reddish blue. |
| 54. | N-methyl-6-isopropyl-benzothiazolyl-2 | OCH₃ | OCH₃ | H | do | Do. |
| 55. | N-methyl-6-tert.butyl-benzothiazolyl-2 | OCH₃ | OCH₃ | H | do | Do. |
| 56. | N-methyl-6-phenyl-benzothiazolyl-2 | OCH₃ | CH₃ | H | do | Reddish blue. |
| 57. | N-methyl-6-(4'-methyl)-phenoxy-benzothiazolyl-2. | OCH₃ | CH₃ | H | do | Do. |
| 58. | N-methyl-6-(4'-chloro)-phenoxy-benzothiazolyl-2. | OCH₃ | CH₃ | H | do | Do. |
| 59. | N-methyl-6-phenoxy-benzothiazolyl-2 | OCH₃ | CH₃ | H | do | Do. |
| 60. | N-methyl-6-chloro-benzothiazolyl-2 | OCH₃ | CH₃ | H | do | Do. |
| 61. | N methyl-6-fluoro-benzothiazolyl-2 | OCH₃ | CH₃ | H | do | Do. |
| 62. | N-methyl-6-bromo-benzothiazolyl-2 | OCH₃ | CH₃ | H | do | Do. |
| 63. | N-methyl-6-tri-fluoromethyl-benzothiazolyl-2 | OCH₃ | CH₃ | H | do | Violet. |
| 64. | N-methyl-6-benzyl-benzothiazolyl-2 | OCH₃ | CH₃ | H | do | Reddish blue. |
| 65. | N-methyl-6-benzyloxy-benzothiazolyl-2 | OCH₃ | CH₃ | H | do | Do. |
| 66. | N-ethyl-4,6,dimethyl-benzothiazolyl-2 | OCH₃ | CH₃ | H | 2'-methyl-4'-hydroxyphenyl | Do. |
| 67. | N-methyl-4,7,dimethyl-benzothiazolyl-2 | OCH₃ | CH₃ | H | 3'-methyl-4'-hydroxyphenyl | Do. |
| 68. | N-benzyl-6-methylthio-benzothiazolyl-2 | OCH₃ | CH₃ | H | 4'-hydroxyphenyl | Do. |
| 69. | N-methyl-6-phenylthio-benzothiazolyl-2 | OCH₃ | CH₃ | H | do | Do. |
| 70. | N-methyl-6-(4'-methyl)-phenylthiobenzothiazolyl-2. | OCH₃ | CH₃ | H | 4'-hydroxy-naphtyl | Blue. |
| 71. | N-methyloxazolyl-2 | OCH₃ | OCH₃ | H | 4'-hydroxyphenyl | Violet. |
| 72. | N-ethyl-6-methoxybenzothiazolyl-2 | O-C₂H₅ | y+z | | do | Blue. |
| 73. | do | H | —CH₂CH₂CH₂CH₂— | | do | Do. |
| 74. | do | OCH₃ | —CH₂CH₂CH₂CH₂— | | do | Do. |
| 75. | do | OC₂H₅ | -CH=CH-CH=CH- | | 2'-hydroxy-5'-methylphenyl | Do. |

In the above table anion ⁻ stands for Cl⁻, Br⁻, I⁻, HSO₄⁻, H₂PO₄⁻, ½SO₄⁻⁻, ZnCl₃⁻, CH₃SO₃⁻, C₂H₅SO₃⁻, C₄H₉—SO₃⁻, CH₃—O—SO₃⁻, C₂H₅—O—SO₃⁻, C₆H₅—SO₃,⁻, CH₃—C₆—H₄—SO₃⁻ (ortho- or para), Cl—C₆H₄—SO₃⁻ (ortho or para), NO₂—C₆H₄—SO₃⁻ (meta), HCOO⁻, CH₃—COO⁻, C₂H₃COO⁻, C₃H₇—COO⁻, Cl—CH₂—COO⁻, C₆H₅—COO⁻, the lactate, oxalate, tartrate or citrate ion. The dyestuffs are sufficiently soluble in water to be suitable for dyeing polyacrylonitrile fibers from aqueous solution. Anion⁻ can also be a caproate, enanthate, caprylate, pelargonate, caprate, undecylate, laurate, myristate, palmitate, sterate, arachinate, oleate, elaidinate, erucate, linoleate or linolenate ion, in which case the dyestuffs are less soluble in water, but are soluble in organic solvents, e.g., acetone, methylene chloride or dimethylformamide, and are thus suitable for dyeing secondary cellulose acetate and triacetate and polyacrylonitrile in the mass and polyacrylonitrile fibers from aqueous dispersion. Finally, anion⁻ can also be a phosphotungstate, phosphomolybdate, phosphotungstomolybdate, silicomolybdate or silicotungstate ion; the dyestuffs formed with these are insoluble in water and organic solvents and are valuable pigments.

*Dyeing Example A*

In a high temperature dyeing machine a suspension is prepared with 1 part of the dyeing preparation which is prepared according to Example 1 and contains 35% of the dyestuff of the formula

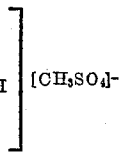

in 3000 parts of water at room temperature, 5 parts of acetic acid and 5 parts of Glauber's salt. 100 parts of yarn of polyacrylonitrile staple fiber are immersed in this liquor at 50°, the machine closed and the inside temperature increased to 130°. Dyeing is continued at this temperature under pressure for 30 minutes. A deep, level blue shade of excellent all-round fastness is obtained.

*Dyeing Example B*

1 part of the dyeing preparation produced according to Example 1 with the dyestuff of the formula

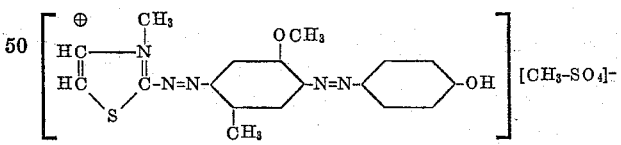

is suspended in 3000 parts of water at room temperature, 5 parts of acetic acid and 2.5 parts of sodium acetate. 200 parts of a blended fabric composed of 60% polyacrylonitrile fiber and 40% wool are entered at 60°, the bath brought to the boil in 30 minutes and boiled for 1 hour.

The fabric is then rinsed, soaped for 20 minutes in a boiling bath containing 1 gram per liter of a non-ionic detergent, rinsed and dried. The synthetic fiber is dyed in a deep violet shade while the wool is reserved.

Dyeing Example C 1 part of the dyeing preparation produced according to Example 1 with the dyestuff of the formula

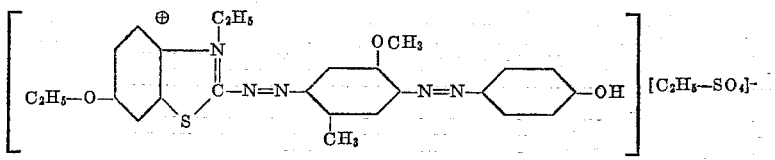

is suspended in 3000 parts of water at room temperature with the addition of 10 parts of acetic acid. 200 parts of a blended fabric composed of 60% polyacrylonitrile fiber and 40% cotton are entered in the dyebath at 55° and dyed for 30 minutes at 125° under presure. A deep, level blue shade is obtained on the polyacrylonitrile fiber while the cotton component is reserved.

Dyeing Example D 30 parts of the dyeing preparation produced according to Example 1 with the dyestuff of the formula

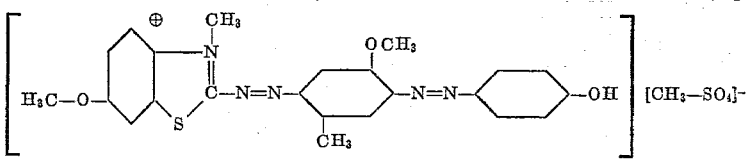

is suspended in hot water with 50 parts of thiodiglycol and 10 parts of acetic acid. A 60% gum tragacanth thickening is added to give 1000 parts of a printing paste which is applied to a fabric of polyacrylonitrile fiber and steamed for 30 minutes in a star steamer or, alternatively, in a pressure steamer at 7 lbs. per sq. in. The level blue print obtained has very good fastness to light and rubbing.

Formulae of representative dyestuffs of the foregoing examples as as follows.

Example 1:

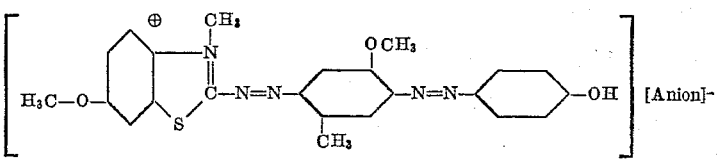

Example 6:

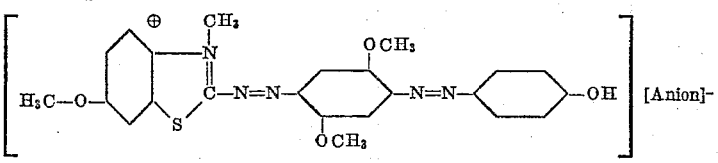

Example 26:

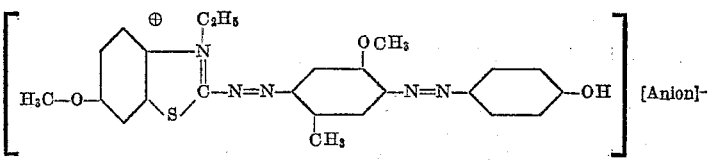

Example 31:

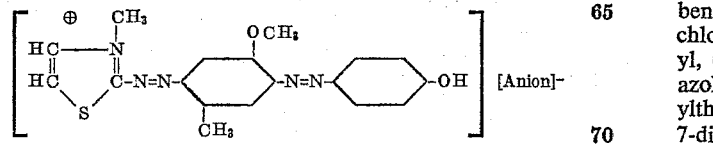

Example 44:

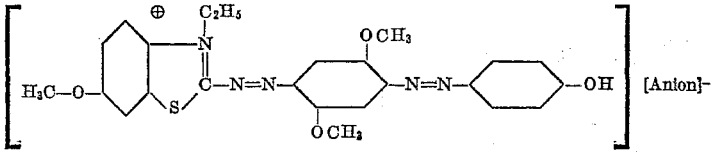

Example 45:

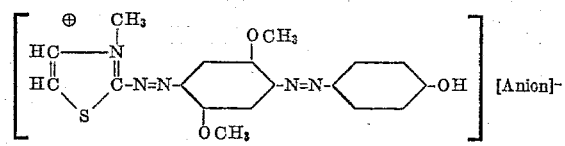

Having thus disclosed the invention what we claim is:
1. Quaternated disazo dyes of the formula

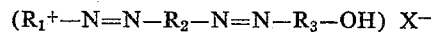

wherein $R_1^+$ is a member selected from the group consisting of N-(lower)-alkylthiazolyl, N-(lower)-alkyloxazolyl, N-(lower)-alkylquinolyl, N-(lower)-alkylisoquinolyl, N-(lower)-alkyltriazolyl, N-(lower)-alkylacridyl, N-(lower)-alkylbenzimidazolyl and N-(lower)-alkylbenzothiazolyl, 6-methylbenzothiazolyl, 6-ethylbenzothiazolyl, 6-methoxybenzothiazolyl, 6-ethoxybenzothiazolyl, 6-phenylbenzothiazolyl, 6-phenoxybenzothiazolyl, 6-chlorobenzothiazolyl, 6-bromobenzothiazolyl, 6-fluorobenzothiazolyl, 6-trifluoromethylbenzothiazolyl, 6-methylphenoxybenzothiazolyl, 6-chlorophenoxybenzothiazolyl, 6-benzylbenzothiazolyl, 6-benzyloxybenzothiazolyl, 6-methylthiobenzothiazolyl, 6-phenylthiobenzothiazolyl and 6-methylphenylthiobenzothiazolyl; 4,6-dimethylbenzothiazolyl; 4, 7-dimethylbenzothiazolyl; N-methyl-5-methylthiazolyl; 2-methylpyridyl; 3-methylpyridyl; 6-methylbenzoxazolyl; 6-methoxybenzoxazolyl, wherein lower alkyl has 1 to 2 carbons, said $R_1$ containing at least one quaternized nitrogen atom in the ring, $R_2$ is a member selected from the group consisting of phenylene, lower alkyl-phenylene, lower dialkyl-phenylene, lower dialkoxy-phenylene, lower alkoxy-phenylene, lower alkyl - lower - alkoxy - phenylene, chlorophenylene, bromo-phenylene, lower alkanoyl-aminophenylene, naphthylene, lower alkoxy-naphthylene, lower alkoxy-5,6,7,8-tetrahydronaphthylene, the phenylene and naphthylene radical being linked to the —N=N-bridges in the positions 1 and 4, $R_3$—OH is a member selected from the group consisting of hydroxy-phenyl, hydroxy-lower alkyl-phenyl, hydroxy-lower alkanoylamino-phenyl, hydroxynaphthyl, methylpyrazolonyl, phenylpyrazolonyl and (phenylcarbamyl)-(acetyl)-methyl and $X^-$ is an anion which carries the same number of charges as the cation in the dyestuff.

2. The quaternated azo dyestuff of the formula

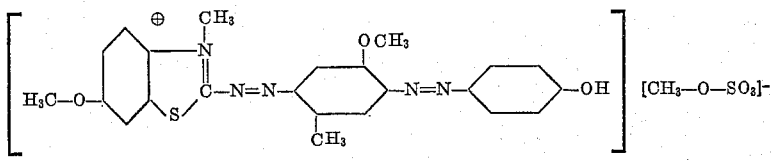

3. The quaternated azo dyestuff of the formula

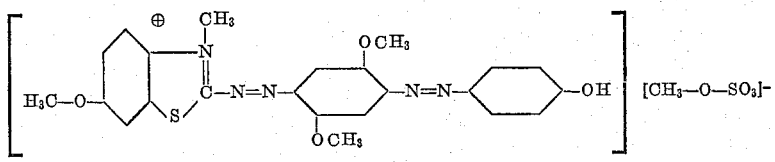

4. The quaternated azo dyestuff of the formula

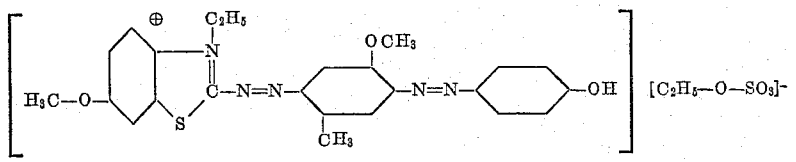

5. The quaternated azo dyestuff of the formula

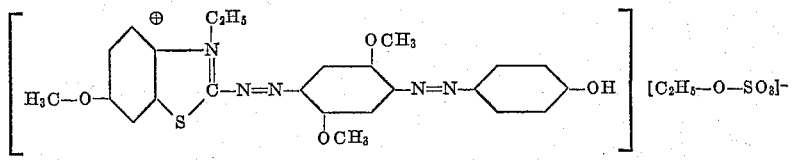

6. The quaternated azo dyestuff of the formula

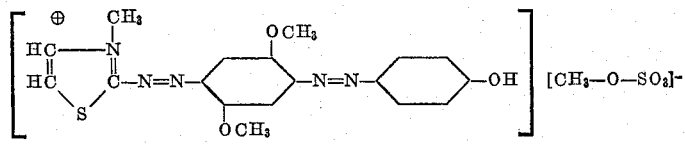

References Cited in the file of this patent
UNITED STATES PATENTS

| | | |
|---|---|---|
| 2,216,446 | McNally et al. | Oct. 1, 1940 |
| 2,359,862 | Linch | Oct. 10, 1944 |
| 2,771,466 | Towne et al. | Nov. 20, 1956 |
| 2,852,504 | Towne et al. | Sept. 16, 1958 |
| 2,864,812 | Bossard et al. | Dec. 16, 1958 |
| 2,893,816 | Tsang et al. | July 7, 1959 |
| 2,913,303 | Baumann et al. | Nov. 17, 1959 |

UNITED STATES PATENT OFFICE
CERTIFICATE OF CORRECTION

Patent No. 3,133,052 May 12, 1964

Ernest Merian et al.

It is hereby certified that error appears in the above numbered patent requiring correction and that the said Letters Patent should read as corrected below.

Column 1, line 15, for "hereocyclic" read -- heterocyclic --; line 31, for "hererocyclic" read -- heterocyclic --; column 2, line 26, for "acdis" read -- acids --; column 3, lines 11 to 15, for the left-hand end of the formula reading:

$HC_3-O-$  read  $CH_3-O-$ columns 3 and 4, in the table, item 39, under the heading "R1", for "N-methyl-6-methoxybenzocazolyl-2" read -- N-methyl-6-methoxybenzoxazolyl-2 --; column 5, the last formula, for the left-hand end of the formula reading:

$N_3C-O-$  read  $H_3C-O-$ columns 5 and 6, in the table, item 70, under the heading "R3-OH" for "4'-hydroxy-naphtyl" read -- 4'-hydroxy-naphthyl --; column 7, line 38, for "as", first occurrence, read -- are --.

Signed and sealed this 1st day of December 1964.

(SEAL)
Attest:

ERNEST W. SWIL.
Attesting Officer

EDWARD J. BRENNER
Commissioner of Patents